Sept. 23, 1958     O. W. DOMRIES     2,852,995
MARCEL DITCHER

Filed Sept. 7, 1954     2 Sheets-Sheet 1

OTTO W. DOMRIES,
INVENTOR.

BY HIS ATTORNEYS.

HARRIS, KIECH, FOSTER & HARRIS.

Sept. 23, 1958     O. W. DOMRIES     2,852,995
MARCEL DITCHER
Filed Sept. 7, 1954     2 Sheets-Sheet 2
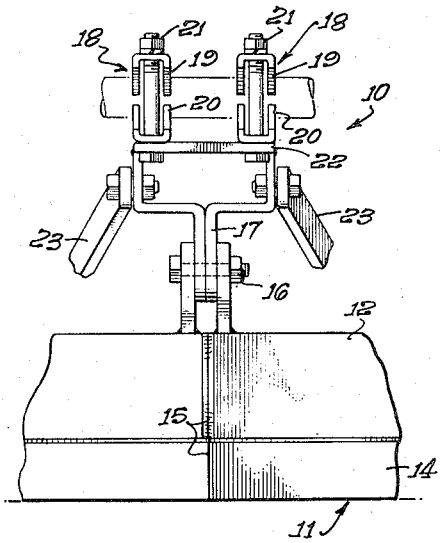
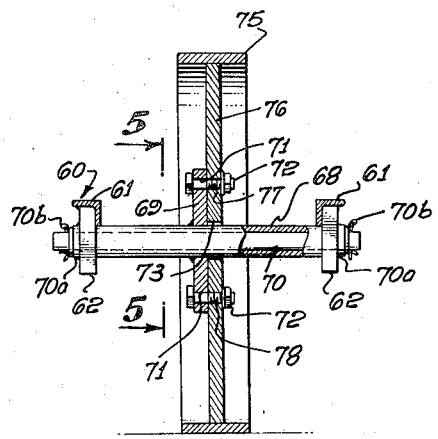
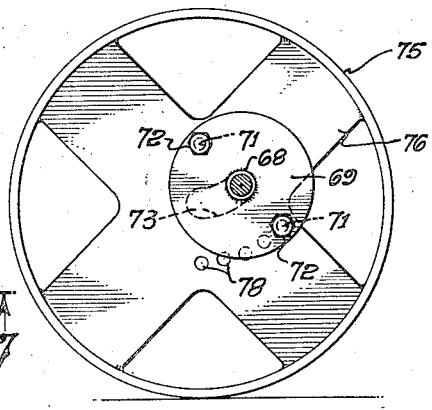
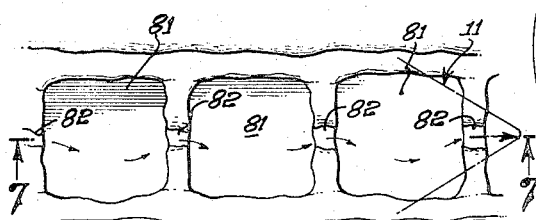
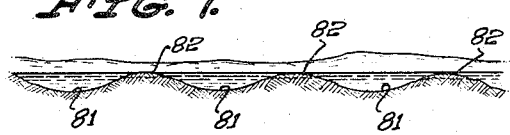
OTTO W. DOMRIES,
INVENTOR.
BY HIS ATTORNEYS.
HARRIS, KIECH, FOSTER & HARRIS.

United States Patent Office 2,852,995
Patented Sept. 23, 1958

2,852,995

MARCEL DITCHER

Otto W. Domries, Anaheim, Calif.

Application September 7, 1954, Serial No. 454,457

7 Claims. (Cl. 97—55)

The present invention relates to a new type of machine for digging marcel-type irrigation ditches. More specifically, it is preferred to term the apparatus of this invention a "marcel ditcher."

As used in this specification, the term "marcel" refers to a wave shape. Thus, the apparatus of the invention is designed to produce ditches which are generally the shape of a wave and vary both in their depth and in their width, so as to provide small, deep pockets within the ground, these pockets being interconnected by flow channels.

In large scale farming practice with the aid of irrigation, there frequently is a considerable problem as to how to best utilize a stream of water in accomplishing the desired purpose of watering growing crops or trees. The precise means involved can be varied within wide limits, depending upon the nature of the crops, the nature of the soil and the availability of water. It is customary to convey irrigation water directly to small, straight furrows, created by means of a plow, through distribution canals or conduits. The water within such furrows tends to be of equal depth and to flow from one end of the furrow to the other directly. Thus, the water within such furrows presents a maximum surface area for evaporation and a maximum area in contact with the ground for rapid dispersion throughout the adjacent soil.

This type of water distribution is considered undesirable for several reasons, and it is a prime object of the invention to teach a method for irrigation which overcomes many of the defects in such prior procedures. It is a further object of the instant invention to accomplish these ends by creating a ditching machine which can be used to create irrigation furrows which vary both in depth and cross-sectional area. In such irrigation furrows, pools of water are formed periodically during use which tend to hold "extra" irrigation water in order that this water can penetrate deeply into the soil adjacent to the pools. This latter is extremely important in some instances inasmuch as with the prior irrigation furrows water tends to congregate in the spot of lowest elevation, not to be distributed evenly throughout the furrow.

A further object of the invention is to produce a machine of the class described which is relatively simple in constructional details and which can be easily and conveniently manufactured. A still further object of the invention is to produce a machine of the class described which is extremely effective in use in creating marcel-type irrigation ditches; that is, irrigation furrows having recurrent depressions capable of holding pools of water so that this water may penetrate deeply into the soil adjacent to the pools.

Another object of the invention is to teach the formation of irrigation furrows varying regularly in depth and to teach the formation of irrigation furrows varying regularly in both depth and width. A closely related object is to produce apparatus for creating such furrows, which comprises: plow means; means for varying the angle of incidence of said plow means to the earth; and means for attaching said plow means to appropriate apparatus for moving such plow means. Another object is to produce a machine of the class described, which comprises: plow means; means for varying the angle of incidence of such plow means to the earth; means for moving said plow means; and scoop or blocker means removably attached to said plow means serving to aid in creating a marcel-type irrigation ditch of the class described.

A still further object of the invention is to produce an apparatus of the class described having a V-shaped plow, an eccentric wheel and a scoop or blocker all connected together in such a manner that, as the device is pulled, the eccentric wheel rotates causing the plow to recurrently move up and down within the soil and causing the blocker to similarly move up and down within the furrow created by the plow, causing a marcel-type irrigation furrow or ditch to be produced.

Further details of the invention and further objects of it will be more fully apparent with reference to the balance of this specification, the appended claims and the accompanying drawings, in which:

Fig. 3 is a partial front view of the device taken along line 3—3 shown in Fig. 1;

Fig. 4 is a sectional view taken at line 4—4 of Fig. 1;

Fig. 5 is a detail view of part of the wheel construction employed with the invention taken along line 5—5 of Fig. 4;

Fig. 6 is a top view showing marcel ditches of the invention; and

Fig. 7 is a sectional view taken at line 7—7 of Fig. 6.

Figure 1:
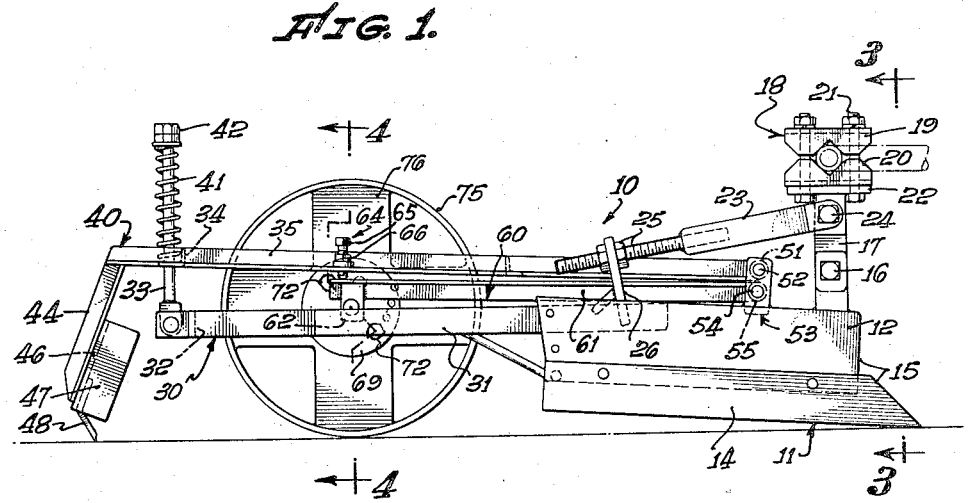
Fig. 1 is a side view of an apparatus of the invention.
Figure 2:
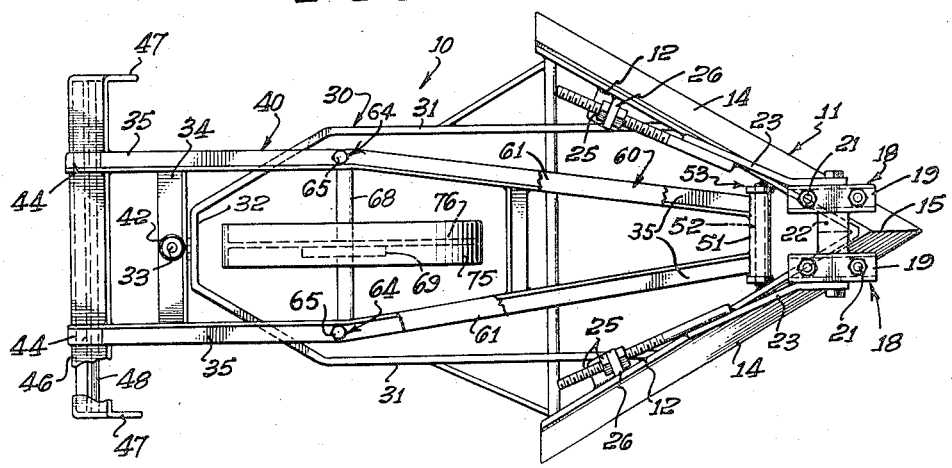
Fig. 2 is a top view of the device shown in Fig. 1.

In Figs. 1 and 2 of the drawings, it is seen that the machine 10 of the invention for digging marcel-type irrigation comprises a plow 11 consisting of an upstanding mouldboard 12 to which there is attached a lower projecting cutting edge 14, both the mouldboard 12 and the cutting edge 14 terminating in a front point 15.

Directly above this point 15, there is attached to the mouldboard 12 a pivot 16, to which there are attached upstanding L-shaped links 17 as best shown in Fig. 3 of the drawings. These L-shaped links 17 are attached at their upper extremities to square tool-bar clamps 18 of a type known to the art. These clamps consist of upper and lower halves 19 and 20, respectively, secured to each other by means of bolts 21. The tool clamps are held apart by means of a support member 22. Directly beneath the tool-bar clamps 18, tie rods 23 are attached to the links 17 by means of pivotal elements 24. These elements may comprise common bolts, as may the pivot 16. The ends of the tie rods 23 removed from the pivots 24 are adjustably attached by thread and nut means 25 to braces 26, secured to the mouldboard 12 as shown. Thus, with this construction, it is possible by adjusting the thread and nut means 25 to change the effective length of the tie rods 23, moving the tool-bar clamps 18 slightly ahead of or to the rear of the edge 15 as desired, depending upon whether it is desired to raise or lower the rear of the machine 10.

Secured to the rear of the plow 11, as by welding, is a plow frame 30 having a generally three-sided configuration, as shown in Fig. 2 of the drawings. It consists of sides 31 and a rear end 32, intermediate the ends of which is an upstanding frame bolt 33 projecting through a cross brace 34 disposed between the sides 35 of a blocker frame 40, as best shown in Fig. 2 of the drawings. The upper end of this frame bolt on the side of the blocker frame 40 removed from the plow frame 30 is surrounded by means of a spring 41 secured to both the cross brace 34 and to an enlarged terminal end 42 of the frame bolt 33.

The blocker frame 40, as is best shown in Figs. 1 and 2 of the drawings, contains at its rear dependent supports 44 leading to a blocker 45, consisting of an upstanding back wall 46, secured to the supports 44, side walls 47 and a lower cutting edge 48. This edge 48 is generally within the same relative plane as the cutting edge 14 of the plow 11.

The front portions of the sides 35 of the blocker frame 40 are connected to a hollow tubular member 51 disposed around a cylindrical shaft 52 carried by a pivot frame 53, secured to the mouldboard 12 of the plow 11 immediately to the rear of the tie rods 23, as is seen in Figs. 1 and 2 of the drawings. Thus, the blocker frame 40 as shown in this construction is free to rotate up and down with respect to the plow 11 except as this motion is governed by means of the frame bolt 33 which is attached to this blocker frame 40 by means of the spring 41.

Directly beneath the shaft 52 in the pivot frame 53 is a second shaft 54 which is secured to the pivot frame 53 in the same manner in which the shaft 52 is secured to this pivot frame. Surrounding the shaft 54, there is disposed a second hollow tubular member 55 which is free to rotate about the shaft 54. Secured to the ends of this member 55 are the sides 61 of a wheel frame 60 to which, removed from the member 55, are secured bearings 62 (Fig. 4). Immediately above the sides 61, there are placed small adjustable stop means 64 secured to the sides 35 of the blocker frame 40 so as to normally bear against the sides 61. As illustrated in Fig. 1 of the drawings, these adjustable stop means 64 can merely consist of bolts 65 provided with appropriate retaining nuts 66.

The bearings 62 carry a tube 68 surrounding a rod 70 having end washers 70a and cotter keys 70b holding this tube 68 in place, the center portion of the tube 68 being secured to a face plate 69 positioned between the bearings 62. The face plate 69 contains two apertures 71, within which there are disposed bolts 72 for the obvious purpose of holding the face plate with respect to a wheel hub 76 of a wheel 75. As illustrated in Figs. 4 and 5 of the drawings, the wheel 75 has one aperture 77 placed upon one side of its axis; a series of other apertures 78 placed upon the other side of its axis, these apertures 78 being located a distance from the aperture 77 equal to the distance between the apertures 71 in the face plates 69; and a center carved slot 73 crossing its axis. With this specific construction, it is possible to have the wheel 75 rotate with any desired degree of eccentricity by merely placing one of the bolts 72 attaching the face plate 69 through any of the holes 78 and the hole 77. Preferably, one of these holes 78 is formed so that the hub 76 will be centered with respect to the face plate 69 when the bolts 72 are placed within this specific hole and the aperture 77.

The operation of the device shown in this drawing is essentially quite simple in spite of the apparent complexity of the construction illustrated. When the marcel-type ditching machine 10 is being transported from one location to another, the wheel 75 is preferably placed so as to be centrally located with respect to the face plate 69. The apparatus may be pulled when assembled in this manner without the plow 11 or the blocker 45 biting into the ground beneath the device. When the machine of the invention is positioned at the start of any desired job, the wheel 75 is adjusted so as to turn in an eccentric manner with respect to the face plate 69 and the balance of the device by means of re-location of one of the bolts 72, as indicated above, and the tool-bar clamps 18 are coupled to the appropriate pulling apparatus, such as, for example, a tractor.

Next, the machine 10 is pulled so as to dig the desired marcel-type irrigation ditch. As the machine is pulled from a position with the center of the eccentric wheel 75 being directly below the axis of the tube 68, the plow 11 will be in its top position and as the wheel rotates in a clockwise manner when the device is viewed as shown in Fig. 1, the sides 61 of the wheel frame 60 will bear against the stop means 64, forcing the blocker frame 40 in an upward position. This motion will be transmitted by means of the frame bolt 33 and the spring 41 to the plow frame 30, forcing the plow 11 down towards the earth as the device continues in motion. At the same time, the blocker 45 will be lifted along with the blocker frame 40.

When the axis of the wheel 75 reaches a point directly above the axis of the tube 68, the plow 11 will tend to turn upwards because of the gradual lowering of the portion of the sides 61 adjacent to the stop means 64, this motion being transmitted through the blocker frame 40, the spring 41, the frame bolt 33 and the plow frame 30 to the plow 11. As this occurs, the blocker 45 will move in contact with the furrow cut by the plow 11, scraping a quantity of dirt. As the point is reached where the plough 11 is at its highest point, this blocker 45 will move upwards by virtue of the action of the blocker frame 40, as previously described, depositing the collected dirt, creating more distinct pockets within the marcel-type irrigation ditch than are created by means of the plow 11 alone.

The precise type of ditch created by the operation of the machine above described is illustrated in Figs. 6 and 7 of the drawings. In Fig. 6, it is seen that this ditch or furrow consists of a plurality of pools or pockets 81, each connected by means of a small channel 82, as shown, which is created by means of water washing along this ditch, the width of this channel being substantially less than the width of the pools 81 and the depth of the pools 81 being substantially greater than the depth of the channels 82. By omitting the blocker means from the device herein described, irrigation ditches of a broad category of the invention can be obtained, but these ditches are not as satisfactory as those obtained with the use of such blocker means inasmuch as the channels between the pools 81 are not, as a rule, as small as the channels created by such blocker means, depositing dirt scraped from the depths of the pools 81 within the region of these channels. It will be realized that the smallness of the channels 82, as shown in Figs. 6 and 7 of the drawings, is quite important as it is the dirt around these channels which serves to hold back the flow of water, forming pockets of water within a marcel-type irrigation furrow of the invention.

It will be realized by those skilled in the art that it is possible to adjust the stop means 64 so as to have the plow means 11 in contact with the ground any given amount of time with respect to rotation of the wheel 75. This is accomplished by merely locating the stop means so that it is contacted by the side 61 during only part of the rotation of the wheel 75.

It will be realized by those skilled in the art that the herein described and disclosed device for digging marcel-type irrigation ditches is capable of wide modifications within the scope of the present disclosure. Such modifications are to be considered as part of the inventive concept insofar as they are defined by the appended claims.

I claim as my invention:

1. A machine for digging marcel-type irrigation ditches, which comprises: V-shaped plow means; a plow frame extending back from the rear of said plow means; an upstanding pivot means attached to said plow means; a wheel frame pivotally attached to said pivot means and extending from said plow means in the same general direction as said plow frame; an eccentric wheel attached to said wheel frame removed from said plow means; a blocker frame pivotally attached to said pivot means and extending in generally the same direction as said wheel frame and said plow frame; a blocker attached to said blocker frame at a position removed from said plow means; spring means connecting said plow frame and said blocker frame for biasing said blocker frame downwardly; stop means mounted on said blocker frame for limiting movement of said wheel frame towards said blocker frame; and means attached to said plow means for pulling said machine.

2. A machine for digging marcel-type irrigation ditches, which comprises: a V-shaped plow having a lower cutting edge and an upper mouldboard; an upstanding pivot frame attached to said mouldboard; a blocking frame pivotally attached to said pivot frame; a blocker attached to said blocker frame at a position removed from said V-shaped plow means; a plow frame attached to said mouldboard and extending generally in the same direction as said blocker frame; lift means connecting said blocker frame and said plow frame; a wheel frame pivotally attached to said pivot frame; an eccentrically mounted wheel attached to said wheel frame; stop means positioned on said blocker frame adjacent said wheel, said stop means serving to limit motion of said wheel frame towards said blocker frame; and means attached to said mouldboard for pulling said machine.

3. A machine for digging marcel-type irrigation ditches, which comprises: a wheel frame; a plow pivotally attached to the front end of said wheel frame; traction means for pulling the plow forward to dig a ditch; a wheel eccentrically mounted on the rear end of said wheel frame so that the rear end of said wheel frame is periodically raised and lowered as the plow is pulled forward; a blocker frame whose front end is pivotally attached to said plow independently of said wheel frame; a blocker carried on the rear end of said blocker frame and so formed and placed that it digs into the bottom of said ditch when said blocker is at its lowest position; and interengageable means on said wheel and blocker frames for communicating up and down movement of said wheel frame to said blocker frame.

4. In an apparatus of the character described, the combination of: plow means comprising a plow frame carrying a plow; traction means for pulling said plow means forwardly to cause said plow to dig a ditch; a wheel frame pivotally connected at its forward end to said plow means forwardly of the rearward end of said plow frame; eccentric wheel means mounted on the rear end of said wheel frame so as to produce up and down movement thereof as said plow means is pulled forwardly; a blocker frame pivotally connected at is forward end to said plow means independently of said wheel frame and forwardly of the rearward end of said plow frame; a blocker carried by the rear end of said blocker frame and adapted to alternately dig into and clear the bottom of the ditch in response to up and down movement of said blocker frame; and interengageable means on said wheel and blocker frames for communicating up and down movement of said wheel frame to said blocker frame.

5. In an apparatus of the character described, the combination of: a plow means comprising a plow frame carrying a plow; traction means for pulling said plow means forwardly to cause said plow to dig a ditch; a wheel frame pivotally connected at its forward end to said plow means forwardly of the rearward end of said plow frame; eccentric wheel means mounted on the rear end of said wheel frame so as to produce up and down movement thereof as said plow means is pulled forwardly; a blocker frame pivotally connected at its forward end to said plow means independently of said wheel frame and forwardly of the rearward end of said plow frame; a blocker carried by the rear end of said blocker frame and adapted to alternately dig into and clear the bottom of the ditch in response to up and down movement of said blocker frame; and interengageable means on said wheel and blocker frames for communicating up and down movement of said wheel frame to said blocker frame, said interengageable means including adjustable means for varying the amplitude of up and down movement of said blocker frame for a given amplitude of up and down movement of said wheel frame.

6. In an apparatus of the character described, the combination of: a plow means comprising a plow frame carrying a plow; traction means for pulling said plow means forwardly to cause said plow to dig a ditch; a wheel frame pivotally connected at its forward end to said plow means forwardly of the rearward end of said plow frame; eccentric wheel means mounted on the rear end of said wheel frame so as to produce up and down movement thereof as said plow means is pulled forwardly; a blocker frame pivotally connected at its forward end to said plow means independently of said wheel frame and forwardly of the rearward end of said plow frame; a blocker carried by the rear end of said blocker frame and adapted to alternately dig into and clear the bottom of the ditch in response to up and down movement of said blocker frame; interengageable means on said wheel and blocker frames for communicating up and down movement of said wheel frame to said blocker frame; and spring means acting between said plow frame and said blocker frame for biasing said blocker frame downwardly.

7. An apparatus as defined in claim 4 wherein said eccentric wheel means includes a circular wheel eccentrically mounted on the rear end of said wheel frame.

References Cited in the file of this patent

UNITED STATES PATENTS

| 302,322 | Cole | July 22, 1884 |
| 642,696 | Humphrey | Feb. 6, 1900 |
| 2,021,343 | Wetzel | Nov. 19, 1935 |
| 2,118,462 | Doonan | May 24, 1938 |
| 2,146,222 | Pace | Feb. 7, 1939 |
| 2,155,891 | Campbell | Apr. 25, 1939 |
| 2,187,262 | Brown | Jan. 16, 1940 |
| 2,241,752 | Wentworth | May 13, 1941 |
| 2,362,728 | Smith | Nov. 14, 1944 |
| 2,489,930 | Reahard | Nov. 29, 1949 |
| 2,493,811 | Graham | Jan. 10, 1950 |